United States Patent [19]
Weiss

[11] 3,886,425
[45] May 27, 1975

[54] DRIVE MECHANISM FOR OPENING AND CLOSING DOORS OR THE LIKE

[75] Inventor: Bruno E. Weiss, Liestal, Switzerland

[73] Assignee: Magnetic Elektromotoren AG, Liestal, Switzerland

[22] Filed: Nov. 21, 1972

[21] Appl. No.: 308,371

[30] Foreign Application Priority Data
Nov. 29, 1971 Switzerland.......... 17349/71
Sept. 22, 1972 Switzerland.......... 13849/72

[52] U.S. Cl. ............. 318/468; 318/436; 318/267; 318/282; 318/286; 49/340; 49/28
[51] Int. Cl. ............................ H02f 3/00
[58] Field of Search ......... 318/466, 467, 468, 469, 318/267, 282, 286, 436; 49/340, 28

[56] References Cited
UNITED STATES PATENTS

| | | | |
|---|---|---|---|
| 1,326,130 | 12/1919 | Elliott | 318/468 X |
| 1,817,638 | 7/1931 | Morris | 318/468 X |
| 2,315,582 | 5/1943 | Blodgett | 318/436 UX |
| 2,316,309 | 4/1943 | Blain | 49/340 X |
| 2,481,989 | 9/1949 | Eddison | 49/340 X |
| 2,843,376 | 7/1958 | Osuch et al. | 318/286 X |
| 2,895,728 | 7/1959 | Edelman | 318/267 X |
| 2,924,449 | 2/1960 | Leimer et al. | 49/340 X |
| 2,995,634 | 8/1961 | Richmond | 318/267 X |
| 3,180,635 | 4/1965 | Miller | 318/286 |

Primary Examiner—T. E. Lynch
Attorney, Agent, or Firm—Ladas, Parry, Von Gehr, Goldsmith & Deschamps

[57] ABSTRACT

An electro-mechanical drive mechanism for opening and closing doors or the like, wherein there are provided a blockable electric motor, a transmission mechanism possessing a transmission ratio which is variable throughout the intended transmission range and drivingly connected with the electric motor and the door, and resiliently flexible stop means for limiting movement of the transmission mechanism in two terminal positions.

11 Claims, 19 Drawing Figures

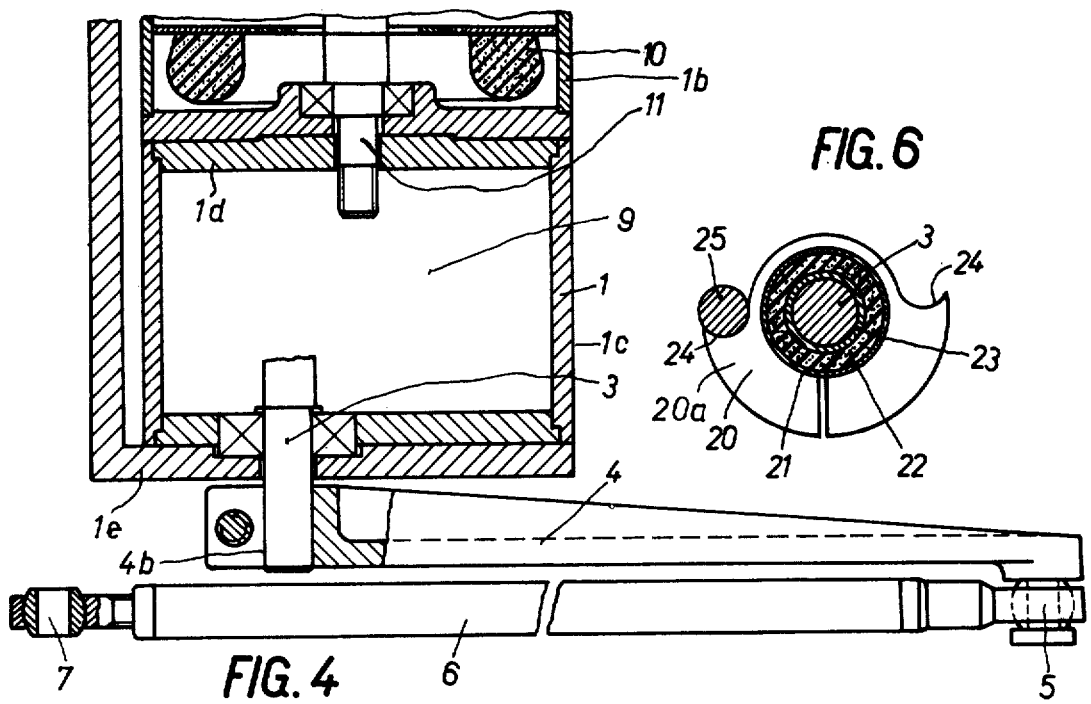
FIG. 6
FIG. 4
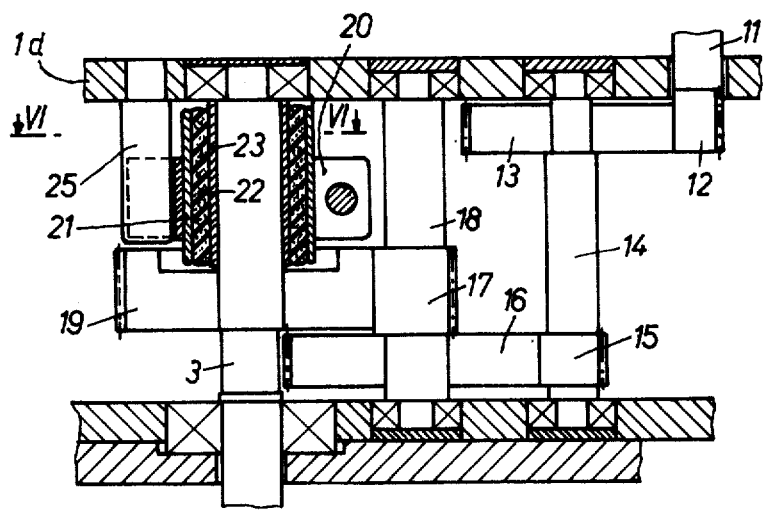
FIG. 5

3,886,425

DRIVE MECHANISM FOR OPENING AND CLOSING DOORS OR THE LIKE

BACKGROUND OF THE INVENTION

The present invention relates to a new and improved construction of electro-mechanical drive mechanism for opening and closing doors.

Drive mechanisms for opening and closing doors should be able to quickly open and close the associated door. To achieve this result the door must be capable of being quickly accelerated and appropriately strongly braked. Prior art constructions of electro-mechanical drive mechanisms typically embody two motors: a quick running motor for acceleration and a slower running motor for braking the swinging or rotary door movement. A switching device which travels in synchronism with the movement of the door switches-off one motor and switches-on the other motor upon reaching a predetermined angle of opening of the door. Some of the more significant drawbacks associated with such type state-of-the-art devices are the complicated construction of the equipment, the susceptibility to breakdown or disturbances and the high costs thereof.

SUMMARY OF THE INVENTION

Hence, it should be apparent that this particular field of technology is still in need of a door drive mechanism which is not associated with the aforementioned drawbacks and limitations of the prior art constructions discussed above. Therefore, it is a primary object of the present invention to provide an improved construction of drive mechanism for opening and closing doors or the like which effectively and reliably fulfills the existing need in the art and is not associated with the aforementioned drawbacks and limitations.

Still another object of the present invention relates to an improved construction of electro-mechanical drive for doors which avoids the aforementioned drawbacks, is relatively compact in construction, inexpensive to manufacture and extremely reliable in operation.

Now in order to implement these and still further objects of the invention, which will become more readily apparent as the description proceeds, the invention drive mechanism is generally manifested by the features that there are provided a blockable electric motor, a transmission mechanism with variable transmission ratio over the transmission range and drivingly connected with the electric motor and the door, and resiliently flexible stop means for limiting the movement of the transmission mechanism in two terminal positions.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 4 is a cross-sectional view through the motor and transmission housing;

FIG. 5 is an enlarged cross-sectional view through the transmission housing with an elastic impact or stop segment connected with the drive shaft;

FIG. 6 is a cross-sectional view of the arrangement of FIG. 5, taken substantially along the line VI—VI thereof;

DETAILED DESCRIPTION OF THE PREFERRED EMBODIMENTS

Figure 1:
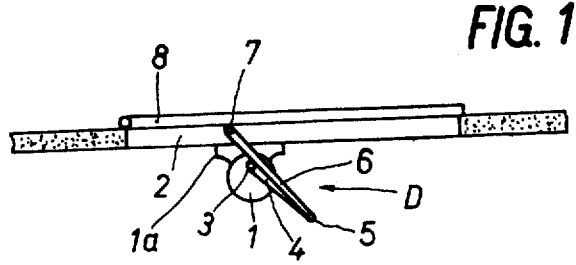
FIG. 1 schematically illustrates a first embodiment of drive mechanism designed according to the teachings of the present invention and for the purpose of explaining its mode of operation shown employed in conjunction with a door, wherein such door is shown in its closed position.
Figure 2:
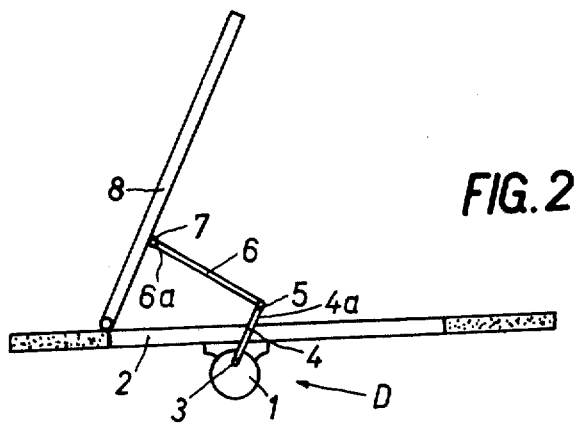
FIG. 2 illustrates the drive mechanism of FIG. 1 with the door half open.
Figure 3:
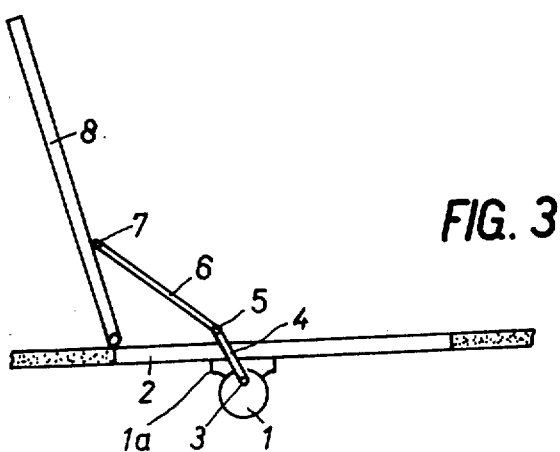
FIG. 3 illustrates the drive mechanism of FIG. 1 with the door completely open.

Describing now the drawings, in FIGS. 1 to 3 there is schematically illustrated a door 8 in three different positions, the door being shown in its closed position in FIG. 1 and in two different open positions in FIGS. 2 and 3 respectively. The door 8 is moved by a drive mechanism D secured to the door frame. The drive mechanism D of this development embodies a housing 1 containing therein, as will be fully explained shortly, an electric motor and a transmission. The housing 1 is mounted by a bracket 1a or other suitable attachment device to the upper door frame beam or joist 2. A drive shaft 3 extends out of the housing 1. A drive lever 4 is secured to the drive shaft 3, at the outer end 4a of the drive lever 4 there is connected a rod 6 through the agency of a first hinge joint 5. The opposite end 6a of the rod 6 is pivotably mounted, through the agency of a second hinge joint 7, at the upper edge of the door 8.

As explained above the door 8 is shown in its closed position in FIG. 1. The angle enclosed by the drive lever 4 and the rod 6 at the region of the hinge joint 5 is very small. With the door 8 in a half-open position, as shown in FIG. 2, the enclosed angle amounts to approximately 90° and with the door completely opened, as shown in FIG. 3, this angle amounts to almost 180°.

Due to this arrangement of the drive lever 4 and the rod 6 a constant rotational speed of the drive shaft 3 is converted into a non-uniform rotational speed of the door 8, since only the velocity component extending in the direction of the lengthwise axis of the rod 6 at the region of the first hinge joint 5 is transmitted to the door 8. In the event that the angle between the drive lever 4 and the rod 6 amounts to 0° or 180° then this component amounts to zero; with respectively increasing or decreasing angle such increases and assumes a maximum value at an angle of 90°. Owing to the selected lever arrangement the door 8 is slowly accelerated out of the momentary terminal position, attains its greatest rotational speed at an angle of 90° between the rod 6 and the drive lever 4, and is then braked to a rotational speed of zero with an enclosed angle of 0° or 180°.

In order to be able to manually open the door in the event of an emergency, for instance if the power supply to the electric motor is interrupted, the enclosed angle in the terminal positions of the door should not be equal to 0° or 180°, because then the lever arrangement will be located in a dead-center position. The possible angle of rotation of the drive shaft 3 is limited to be less than 180° by means of a stop or impact mechanism which will be discussed more fully hereinafter. The length of the drive lever 4 and the rod 6 and their arrangement with regard to the door 8 is chosen in such a way that upon impact of the drive shaft the door is just closed, and the angle between the drive lever 4 and the rod 6 is very small, but not equal to 0°.

FIG. 4 illustrates a cross-sectional view through an approximately cylindrical-shaped housing 1 of the drive mechanism D which is secured to the door frame, and which housing possesses an upper portion 1b and a lower portion 1c. In the upper housing portion 1b there is mounted a slowly rotating single-phase capacitor or condensor motor 10 which, when impressed with a voltage, is in a continuously blocking state, and therefore, exhibits a rotational moment which is approximately of the same magnitude as the maximum rotational moment during the rated rotational speed. The motor shaft 11 extends into the lower portion 1c of the housing 1 where there is arranged a speed reduction transmission or stepdown gearing 9 for reducing the rotational speed of the drive motor 10 and as such speed reduction gearing has been best illustrated in FIG. 5. A first gear 12 is mounted upon the motor shaft 11, gear 12 driving a second larger gear 13 mounted upon a first intermediate shaft 14. A third small gear 15 coupled with the first intermediate shaft 14 meshes with a larger fourth gear 16 mounted upon a second intermediate shaft 18. A fifth small gear 17, which is mounted upon the second intermediate shaft 18, engages with a larger sixth gear 19 coupled with the drive shaft 3.

Between the partition wall 1d between the motor unit and transmission unit and the sixth gear 19 there is elastically coupled with the drive shaft 3, through the agency of a silent block, consisting of a first metallic collar 21, a rubber intermediate layer 22 and a second metallic collar 23, an impact or stop segment 20. The impact or stop segment 20 essentially possesses the shape of a hollow cylinder, wherein a first cylindrical sector 20a extending over an angle of more than 180° possesses a greater radius than the remainder of the hollow cylinder. At the transition locations from one to the other radius there are formed semi-circular shaped impact of stop surfaces 24. A substantially cylindrical-shaped stop or impact bolt 25 is mounted at the housing 1 in such a manner that it limits the angle of rotation of the stop segment 20 by impacting against its stop or impact surfaces 24. Owing to the elastic rubber intermediate layer 22 the drive shaft 3 is resiliently braked. Consequently, the rotational movement of the remaining transmission components are also resiliently slowed down or braked, so that damage to the gears can be prevented, as such might arise during sudden blocking.

As clearly seen by referring to FIG. 4, the drive shaft 3 extends out of the underside 1e of the housing 1, seats in a bore 4b at one end of the drive lever 4 and is operatively coupled therewith. At the other end 4a of the drive lever 4 there is located the first hinge joint 5, by means of which the rod 6, which in turn is coupled with the door 8 through the agency of the second hinge joint 7, can be rotatably mounted at the drive lever 4.

There will now be considered hereinafter other possible constructional embodiments of the impact or stop mechanism.

Figure 7:
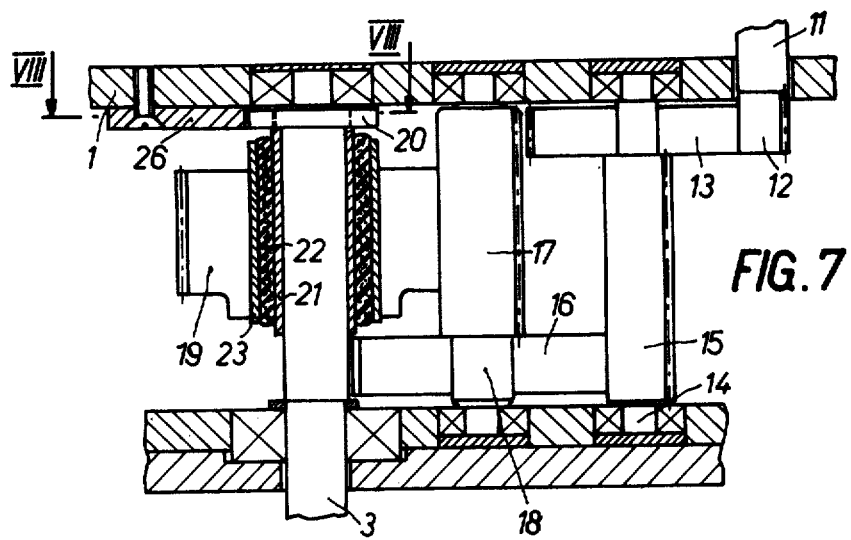
FIG. 7 is a cross-sectional view through the transmission housing with a gear drawn onto or mounted upon a rubber element.
Figure 8:
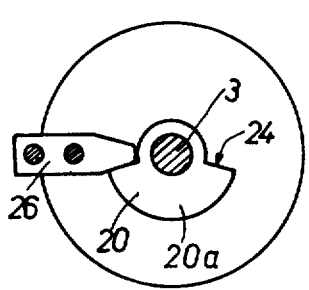
FIG. 8 is a cross-sectional view of the arrangement of FIG. 7, taken substantially along the line VIII—VIII thereof.

With the variant construction illustrated in FIGS. 7 and 8 the third and fifth gears 15 and 17 are designed wider than in the described preferred exemplary embodiment. The sixth gear 19 is elastically coupled with the drive shaft 3 through the agency of a silent block or sound dampening block, consisting of a first metallic collar 21, a rubber intermediate layer 22 and a second metallic collar 23. A hollow cylindrical shaped stop or impact segment 20 equipped however with a sector 20a of larger radius and possessing two stop or impact surfaces 24 is seated upon the drive shaft 3. An impact or stop ledge 26 threaded onto the housing 1 abruptly limits the angle of rotation of the drive shaft 3. Owing to the rubber intermediate layer 22 this limiting action is elastically transmitted to the gears.

Figure 9:
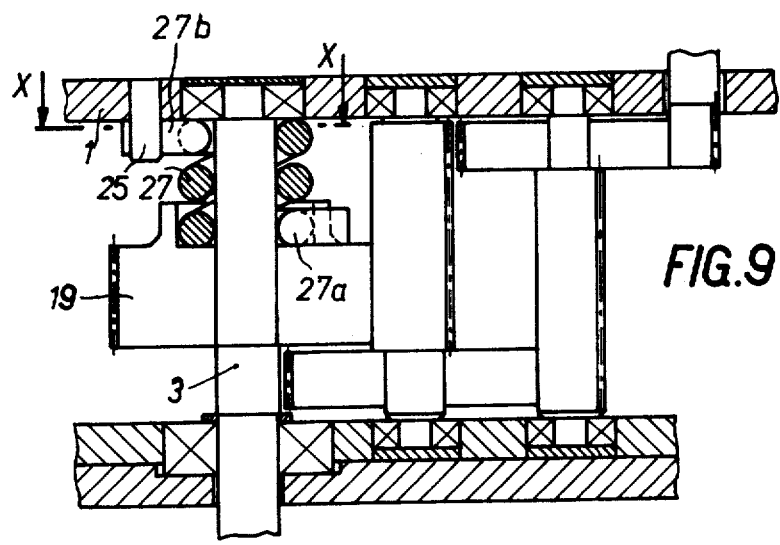
FIG. 9 is a cross-sectional view through a portion of the transmission housing employing a spiral spring as the elastic impact or stop element.
Figure 10:
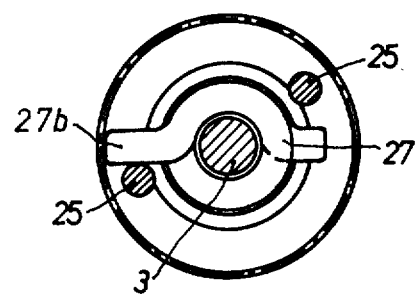
FIG. 10 is a cross-sectional view of the arrangement of FIG. 9, taken substantially along the line X—X thereof.

According to a further embodiment of stop or impact mechanism as depicted in FIGS. 9 and 10 a spiral spring 27 is arranged about the drive shaft 3, the one end 27a of the spiral spring 27 being mounted at the sixth gear 19 which is fixedly connected with the drive shaft 3, whereas the other end 27b of such spring is flexed radially towards the outside and upon striking or impacting against one of both stop or impact bolts 25 coupled with the housing 1 elastically limits the angle of rotation of the drive shaft 3.

Figure 11:
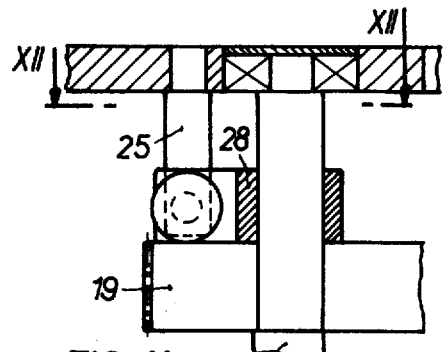
FIG. 11 is a cross-sectional view through a portion of the transmission housing with an impact or stop arm provided with plate spring means.
Figure 12:
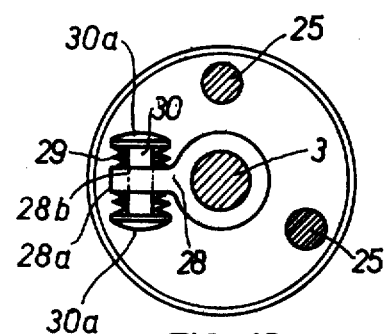
FIG. 12 is a cross-sectional view of the arrangement of FIG. 11, taken substantially along the line XII—XII thereof.

In FIGS. 11 and 12 there is illustrated a further exemplary embodiment of resilient stop, wherein a radially outwardly directed stop or impact arm 28 is fixedly coupled with the drive shaft 3. At the outer end 28a of the impact or stop arm 28 there is slidably arranged in a bore 28b a pin or plug 30 equipped with two semi-circular heads 30a, the lengthwise axis of the pin 30 extending in the tangential direction with respect to the drive shaft 3. Between each respective semi-circular head 30a and the impact arm 28 there is located a respective package of plate springs 29. Two stop or impact bolts 25 secured to the housing 1, against which the pin 30 impinges, elastically limit the angle of rotation of the drive shaft 3 so as to be less than 180° owing to the packages of plate springs 29.

Figure 13:
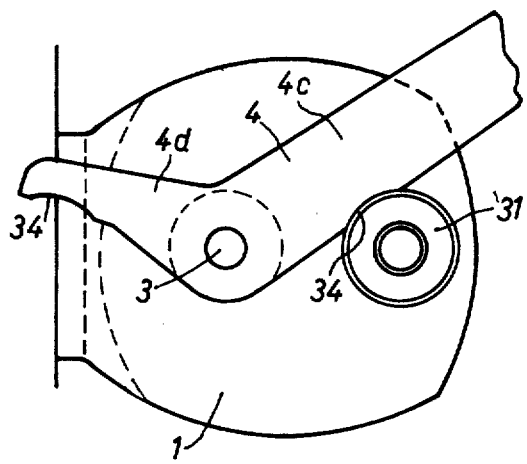
FIG. 13 is a bottom view of a drive lever provided with two impact or stop surfaces and a rubber buffer or check mounted at the housing.

According to a different embodiment of resilient stop as depicted in FIG. 13 the angle of rotation of the drive lever 4 fixedly coupled with the drive shaft 3 is limited externally of the housing 1 by means of an elastic rubber cylinder 31 secured to the housing 1. The drive lever 4 possesses a long lever arm 4c and a short lever arm 4d which collectively form therebetween an obtuse intermediate angle and each of which is provided with a respective circular segment-shaped impact or stop surface 34 corresponding to the circular configuration or rounded configuration of the rubber cylinder 31.

Figure 14:
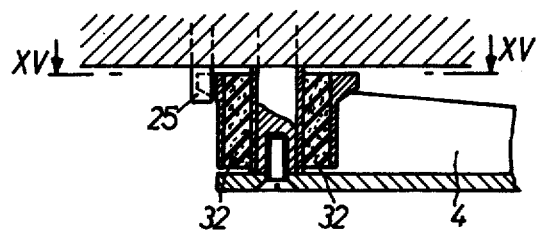
FIG. 14 is a cross-sectional view through a portion of a drive lever equipped with stop or impact surfaces and elastic rubber elements between the drive shaft and the drive lever.
Figure 15:
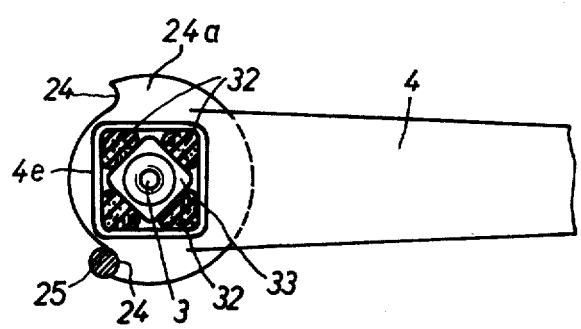
FIG. 15 is a cross-sectional view of the arrangement of FIG. 14, taken substantially along the line XV—XV thereof.

Another embodiment of elastic stop has been depicted in FIGS. 14 and 15. A quadratic or square projection 33 is mounted at the drive shaft 3. The drive lever 4 exhibits an attachment or connection opening 4e of square cross-section, wherein the side length of the square opening is greater than the diagonal of the square projection 33. Between each of the four corners of the connection opening 4e and a respective side surface of the square projection 33 there is pressed-in a cylindrical rubber element 32, in order to obtain an elastic or resilient connection between the drive shaft 3 and the drive lever 4. The drive lever 4 possesses an impact or stop segment 24a with two stop surfaces 24 externally of the connection opening 4e which limit the angle of rotation of the drive lever 4 through impinging against an impact bolt 25 secured to the housing 1.

The described door drive mechanism possesses a number of different advantages in contrast to the known constructions. The electrical control of the drive motor is very simple since for changing the position of the door it is only necessary to reverse the direction of rotation. Since the motor is continuously in operation and in both terminal positions delivers a considerable rotational moment there are not required any additional auxiliary means in order to fixedly retain the door in the open and closed positions. When the motor is without current then the drive mechanism is in its idle state, so that the door can easily be manually opened or closed. But also even if the motor is in operation it is readily possible to manually open and close the door against the drive force of the motor.

Now if it is desired to employ this drive mechanism, for instance for opening and closing garage doors, then there should be realized the performance that the closed garage door cannot be forcefully opened even without the provision of additional locking devices. Such drive mechanism for tiltable doors has been disclosed in FIGS. 16 to 19 and will be considered in detail in connection therewith.

The arrangement depicted in FIGS. 16 to 19 will be seen to embody a tiltable door 108 which is rotatably mounted at both of the sidewalls 112, for instance of a garage. As will be understood from the prior disclosure the drive for the tiltable door 108 consists of a drive unit 101 composed of an electric motor 110 and transmission or gearing accommodated in a housing 120. This drive unit 101 is secured to the ceiling 111 of the garage. A drive shaft 103 protrudes out of the housing, and at this drive shaft 103 there is secured a drive lever 104 which is coupled at its opposite end with a rod 106 by means of a first hinge joint 105. The other end of the rod 106 is coupled via a second hinge joint 107 with the tiltable or pivotal door 108.

The construction of the drive consisting of the electric motor and the transmission corresponds essentially to the construction depicted in FIGS. 4 to 15. It is for these reasons that attention is again directed to such Figures and the associated description as concerns the construction and mode of operation of the drive.

Figure 16:
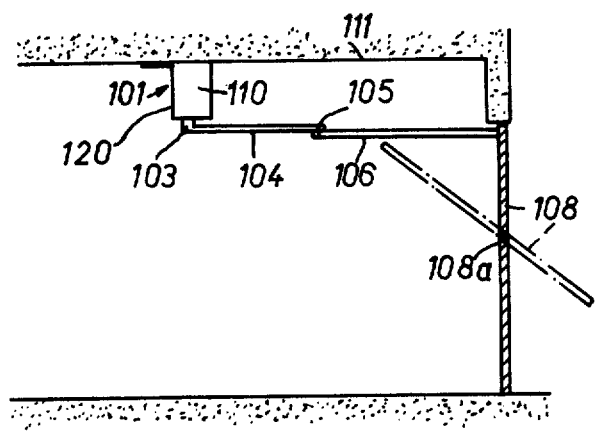
FIG. 16 is a side view of a tiltable door which can be actuated by means of a drive mechanism designed according to the invention.
Figure 17:
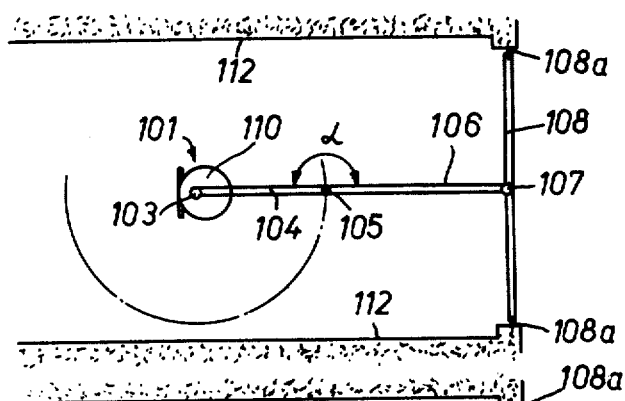
FIG. 17 is a plan view of the arrangement depicted in FIG. 16 with the tiltable door in its closed and locked position.
Figure 18:
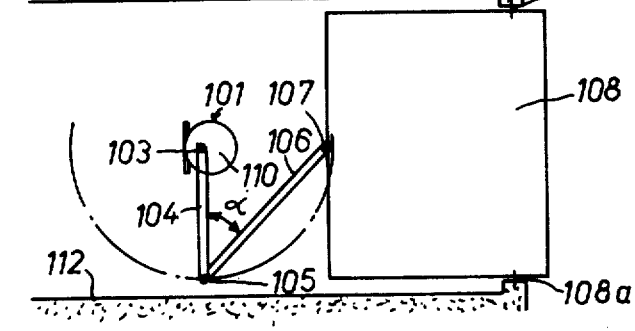
FIG. 18 is a plan view of the arrangement of FIG. 16 with the tiltable door in an intermediate position.

Now in FIGS. 16 and 17 the tiltable door 108 is shown in its closed and locked position. In this position the drive lever 104 and the rod 106 are retained in a dead-center position by means of the electric motor 110 designed as a slowly running single-phase capacitor motor, this electric motor 110 being continuously switched-in. In such dead-center position the angle $d$ (FIG. 17) formed by the drive lever 104 and the rod 106 amounts to 180°. The tiltable door 108 therefore can only be opened by reversing the direction of rotation of the electric motor, not however, for instance, by pushing by means of the hand against the tiltable door.

During opening of the tiltable door 108 the electric motor 110 moves the drive lever 104, with the result that the tiltable door is rocked about its pivot axis 108a through the agency of the rod 106. In FIG. 16 the phantom line illustration of the tiltable door 108 represents an intermediate position. In this intermediate position the drive lever 104 and the rod 106 enclose an acute angle $\alpha$ as such has been depicted in FIG. 18.

Figure 19:
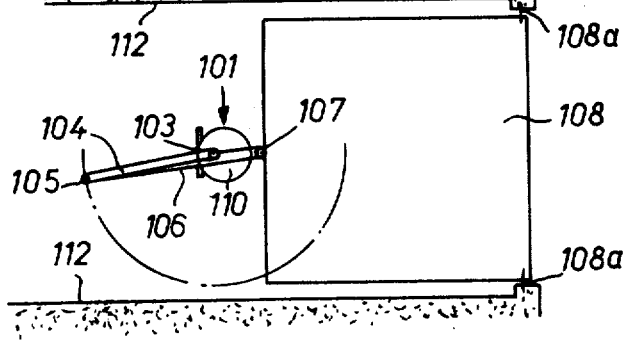
FIG. 19 is a plan view of the arrangement of FIG. 16 with the tiltable door in its open position.

In the open position of the tiltable door 108 as illustrated in FIG. 19, the enclosed angle between the drive lever 104 and the rod 106 is very small, however does not amount to 0° in order to prevent the drive lever and rod from assuming a dead-center position in which it is impossible to close the door manually both when the electric motor 110 is furnished with voltage or also in the event of power failure.

However, it is also conceivable to allow the aforementioned enclosed angle to amount to 0° in the open position of the tiltable door, whereby in this instance the drive lever 104 and the rod 106 assume a dead-center position which would render impossible manually closing the door.

As has been described in detail in conjunction with FIGS. 4 to 15 resiliently flexible stops are provided which serve to limit the pivotal range of the drive lever 104.

Now if there is a power failure when the tiltable door 108 is closed and locked then there is no longer present the rotational moment exerted by the electric motor. The resilient stops which are pre-biased when the motor is switched-on relax and impart to the drive lever 104 a small rotational movement which is sufficient to move this drive lever 104 and the rod 106 out of the dead-center position. Since the motor with the transmission is not self-locking the door can thus be manually opened even upon power failure.

It should be understood that the constructions of stops described in conjunction with FIGS. 4 to 15 must be appropriately modified for the present field of application in order to permit the drive lever 104 and the rod 106 to assume the position wherein they enclose an angle of 180° in the closed position of the door.

While there is shown and described present preferred embodiments of the invention, it is to be distinctly understood that the invention is not limited thereto, but may be otherwise variously embodied and practiced within the scope of the following claims. Accordingly,

What is claimed is:

1. An electro-mechanical drive mechanism for opening and closing a door or the like, comprising:
   a. a drive unit including a blockable, reversible, continuously switched-on electric motor and having an output drive shaft;
   b. a drive lever connected to said output drive shaft;
   c. a coupling member hingedly connected to the drive lever and the door; and
   d. resiliently flexible stop means associated with said output drive shaft to limit the range of rotational movement of said output drive shaft to less than one complete revolution and resiliently to block said electric motor in two terminal positions.

2. The drive mechanism as defined in claim 1, wherein said drive shaft (3) extends out of a stepdown gearing (9) connected to said electric motor (10).

3. The device mechanism as defined in claim 2, wherein the angle of rotation of the drive lever (4) is smaller than 180°, and the angle formed between the rod (6) and the drive lever (4) in the closed position of the door (8) is small but does not equal 0°, in the open position is obtuse but not equal to 180°.

4. The drive mechanism as defined in claim 2, wherein said stop means comprises an impact element (20) possessing at least one impact surface (24) resiliently flexibly connected with the drive shaft (3) and at least one stop bolt (25) for limiting the angle of rotation of the impact element (20).

5. The drive mechanism as fined in claim 2, wherein the stepdown gearing (9) comprises a gear (19) resiliently flexibly mounted upon the drive shaft (3), said stop means comprising an impact segment (20) secured to the drive shaft (3) and at least one stop ledge (26), the angle of rotation of the drive shaft (3) being limited by the impact segment (20) and the stop ledge (26).

6. The drive mechanism as defined in claim 2, said stop means comprising a spiral spring (27) mounted at the drive shaft (3), said spiral spring (27) having one end fixedly connected with the drive shaft and a second radially outwardly flexed end, and at least one stop bolt (25) for limiting the rotational movement of the second end of the spiral spring (27).

7. The drive mechanism as defined in claim 2, said stop means comprising a radially outwardly directed stop arm (28) secured to the drive shaft (3), said stop arm having an outer end, a pin (30) provided for the outer end of the stop arm (28), said pin (30) being resiliently loaded by means of a package of plate spring means (29) acting in tangential direction, and at least one stop bolt (25) for limiting the angle of rotation of the stop arm (28).

8. The drive mechanism as defined in claim 2, wherein the drive lever (4) possesses at least one impact surface (34), and at least one resiliently flexible buffer (31) for limiting the angle of rotation of the drive lever (4).

9. The drive mechanism as defined in claim 2, said stop means including at least one resiliently flexible connection element means (32) provided between the drive shaft (3) and the drive lever (4) at least one stop bolt (25), and at least one impact surface (24) provided at the drive lever (4) for cooperation with the stop bolt (25).

10. The drive mechanism as defined in claim 1, wherein the transmission mechanism comprises two articulated levers (104, 106), one of the levers (109) being operatively connected with the electric motor (110) and the other lever (106) with the door (108), wherein in the closed position the electric motor (110) retains both levers (106, 108) in a dead-center position in which the angle enclosed by both levers amounts to 180°.

11. The drive mechanism as defined in claim 10, wherein the pivotal range of the lever (104) coupled with the electric motor (110) is less than 180° and the electric motor (110) retains the levers (104, 106), in the closed position of the door (108) in a position in which both levers enclose an angle having a value which is near 0° but deviates from 0°.

* * * * *